United States Patent [19]

Walden

[11] 3,852,799

[45] Dec. 3, 1974

[54] BURIED CHANNEL CHARGE COUPLED APPARATUS

[75] Inventor: Robert Henry Walden, Warren, N.J.

[73] Assignee: Bell Telephone Laboratories Incorporated, Murray Hill, N.J.

[22] Filed: Apr. 27, 1973

[21] Appl. No.: 355,214

[52] U.S. Cl. .................................... 357/23, 357/41

[51] Int. Cl. ............................................ H01l 13/00

[58] Field of Search .................... 317/235 G; 357/23

[56] References Cited

UNITED STATES PATENTS

| | | | |
|---|---|---|---|
| 3,651,349 | 3/1972 | Kahng et al. | 317/235 |
| 3,739,240 | 6/1973 | Krambeck | 317/235 |

OTHER PUBLICATIONS

IBM Tech. Discl. Bul., "Unidirectional Charge-Coupled Shift Register" by Anantha et al., Vol. 14, No. 4, Sept. 1971, page 1234.

Electronic Design, "New Surface-Charge Transistor . . ." by Engeler et al., Dec. 20, 1970, page 28.

"Physics and Applications of Charge-Coupled Devices" by Amelio, IEEE Intercon, 28 March 1973, pages 1-6.

*Primary Examiner*—Rudolph V. Rolinec
*Assistant Examiner*—E. Wojciechowicz
*Attorney, Agent, or Firm*—G. W. Houseweart; L. H. Birnbaum; A. J. Torsiglieri

[57] ABSTRACT

The specification describes two-phase buried channel charge coupled devices. The described devices include a semiconductive bulk portion of one conductivity type and an overlying semiconductive storage layer of opposite conductivity type. A plurality of electrodes are serially disposed over an insulating layer which, in turn, overlies the storage layer. Built-in voltage asymmetries, like those used in two-phase surface channel charge coupled devices, are associated with respective electrodes. With given applied operating voltages the direction of mobile charge carrier propagation is opposite that of a surface channel device.

9 Claims, 4 Drawing Figures

BURIED CHANNEL CHARGE COUPLED APPARATUS

BACKGROUND OF THE INVENTION

This invention relates to charge coupled devices and, more particularly, to buried channel charge coupled devices adapted for operation in a two-phase mode.

A basic type of buried channel charge coupled devices was first described in U.S. patent application Ser. No. 131,722, filed Apr. 6, 1971, on behalf of W. S. Boyle and G. E. Smith, abandoned in favor of continuation-in-part application Ser. No. 352,513, filed Feb. 12, 1974, now U.S. Pat. No. 3,792,322. Disclosed therein is a structure having a semiconductive bulk region and an overlying epitaxial storage layer including a distribution of immobile electrical charge such that when electric fields are applied to the storage layer through, for example, a metal-insulator structure, there is formed in the storage layer away from the insulator-storage layer interface, i.e., internally in the storage layer, a potential energy minimum suitable for the storage of a quantity of mobile charge carriers representing information. To enable this condition, the storage layer is of conductivity type opposite that of the bulk region so that a PN junction is formed therebetween; and, by application of suitable voltages, the free charge carriers in the storage layer and in an adjacent portion of the bulk region are drawn out. This extraction of free charge carriers leaves exposed ionized impurities (the dopant impurities) in the storage layer with a charge distribution such that mobile charge carriers injected into the storage layer to represent information are confined in the aforementioned potential energy minimum internally within the storage layer.

Storage, transfer, and manipulation of pluralities of packets of mobile charge carriers representing information are then achieved in accordance with the normal charge coupled mechanism and applied clock voltages, except that in the buried channel structures charge is maintained in the bulk of the storage medium and is electrically and spatially isolated from the insulator-semiconductor interface.

With respect to surface channel charge coupled devices, buried channel charge coupled devices have the advantages that, because the storage and transfer of information takes place in potential minima located away from the semiconductor-insulator interface, the mobile charge carriers are free of losses associated with interface states and also the mobility of the mobile charge carriers is higher than for surface channel devices due to the fact that the bulk mobility is greater than surface mobility. Both of these factors increase efficiency of buried channels relative to surface channel charge coupled devices.

The aforementioned Boyle-Smith disclosure, being a basic one, discloses only three-phase buried channel charge coupled devices; and, as is well known, two-phase devices generally are preferred due to simplified circuitry needed to drive two-phase devices and also due to a reduced number of interconnection problems with two-phase devices.

SUMMARY OF THE INVENTION

It is an object of this invention to provide two-phase buried channel charge coupled devices.

In accordance with the aforementioned object, this invention includes buried channel charge coupled device structures having built-in asymmetries, i.e., such that application of a voltage to any of the transfer electrodes produces under that electrode an asymmetric potential well sufficient for causing mobile charge carriers to propagate unidirectionally when a greater voltage is applied to the electrode next succeeding.

The two-phase buried channel structures in accordance with this invention are similar to those for two-phase surface channel charge coupled devices and are operated similarly, except for the following. First, the storage medium includes a surface layer of one type conductivity disposed over a bulk portion of another type conductivity in having a PN junction therebetween. Second, and unexpectedly, the direction of propagation of mobile charge carriers is opposite that of a surface channel CCD with given built-in asymmetries.

BRIEF DESCRIPTION OF THE DRAWING

The aforementioned and other features, characteristics, and advantages, and the invention in general, will be better understood from the following more detailed description taken in conjunction with the accompanying drawing in which.

It will be appreciated that, for simplicity and clarity of explanation, the figures have not necessarily been drawn to scale.

DETAILED DESCRIPTION

Figure 1:
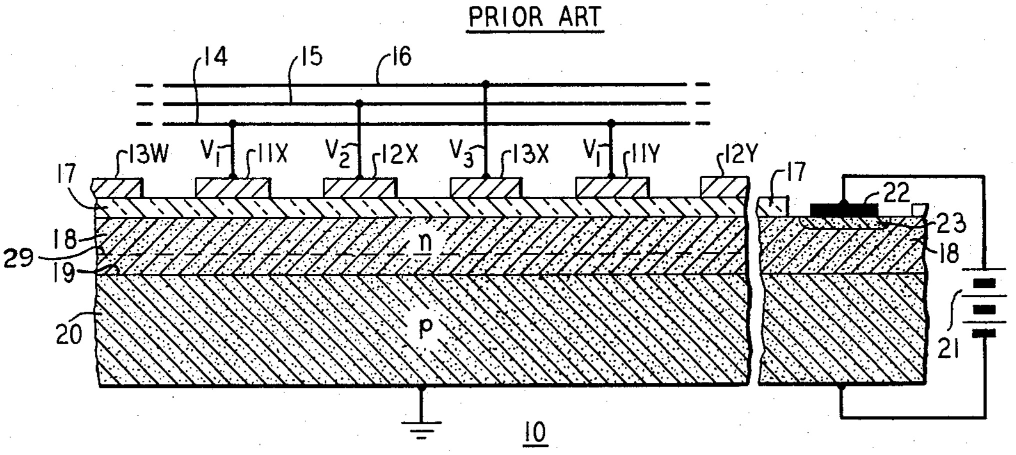
FIG. 1 PRIOR ART
FIG. 1 is a cross-sectional view of a portion of a three-phase prior art buried channel charge coupled device as described in the aforementioned Boyle-Smith disclosure.

Referring now to FIG. 1, there is shown a cross-sectional view of a portion 10 of a prior art three-phase buried channel charge coupled device as described in the aforementioned Boyle-Smith disclosure. As shown, the device includes conventional charge coupled device (CCD) electrodes 11, 12, and 13 coupled to conventional three-phase drive voltages provided via conduction paths 14, 15, and 16, respectively. The aforementioned electrodes are disposed successively over and contiguous with a dielectric layer 17, e.g., about 1000 Angstroms of silicon dioxide, which, in turn, is disposed over and contiguous with a semiconductive wafer. The semiconductive wafer is shown including a storage layer 18 of N-type monocrystalline silicon, which, in turn, is disposed over and forming a PN junction 19 with a bulk portion 20 of typically lightly doped P-type monocrystalline silicon. illustratively, N-type layer 18 may be about 0.4 microns ($4 \times 10^{-3}$ cm.) in thickness and doped to a concentration of about 0.1 to 100 ohm-cm.

In operation, in the buried channel mode, the entire layer 18 and part of the adjacent P-type bulk portion 20 are entirely depleted of mobile charge carriers by providing sufficient reverse-bias across junction 19.

This reverse-biasing is accomplished typically by applying a voltage of suitable polarity from, for example, a DC voltage source 21 (illustrated schematically) through an electrode 22 which is in contact with an auxiliary surface region 23 of conductivity type the same as that of the storage layer 18. This last-mentioned region functions as a collector to enable the complete extraction of mobile charge carriers (in this case electrons) from storage layer 18.

Figure 2:
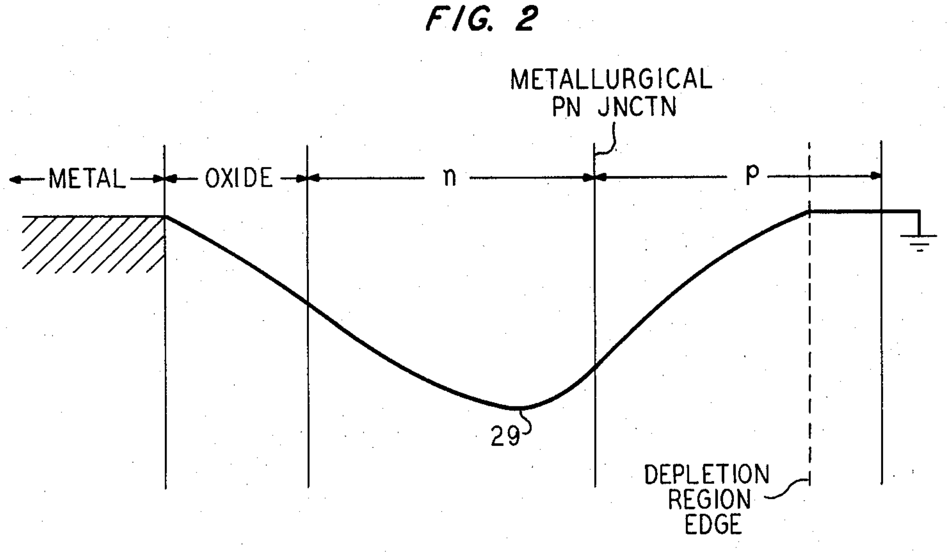
FIG. 2 is an energy level diagram taken perpendicular to the dominant planes of FIG. 1.

After such extraction, there is produced transverse to the dominant planes of the structure of FIG. 1 a potential configuration like that shown in FIG. 2. The significant and distinguishing characteristic of the potential configuration of FIG. 2 is the existence of a potential minimum 29 located away from the semiconductor-insulator interface and lying internally within the storage layer 18. This internal potential minimum, its location and strength are determined by the interaction of the PN junction and the ionized donor impurities in the layer 18 with the applied voltage from battery 21 and the clock voltages applied through electrodes 11–13. In operation, the relative strength of the potential minimum under each respective electrode is affected by the three-phase voltages applied through electrodes 11–13. Suitable voltages provide suitable manipulation of the strengths of the adjacent potential minima under correspondingly adjacent electrodes and enables transfer of packets of mobile charge representing information successively from one electrode to another in a manner analogous to that in surface channel CCD's.

Unfortunately, three-phase buried channel charge coupled devices are subject to many of the disadvantageous characteristics as are three-phase surface channel charge coupled devices. For example, the complexity of three-phase interconnections is, of course, a problem. Also, the existence of spaces between electrodes also is a problem, inasmuch as the existence of such spaces can give rise to inefficient charge transfer from one electrode to another due to a lack of control over the potential in the semiconductor underneath the spaces.

For the foregoing and other reasons, it is desirable to provide two-phase buried channel charge coupled devices and to adapt such devices so as to effectively avoid problems associated with gaps between electrodes. In accordance with this invention, two such two-phase embodiments are described immediately hereinbelow.

Figure 3:
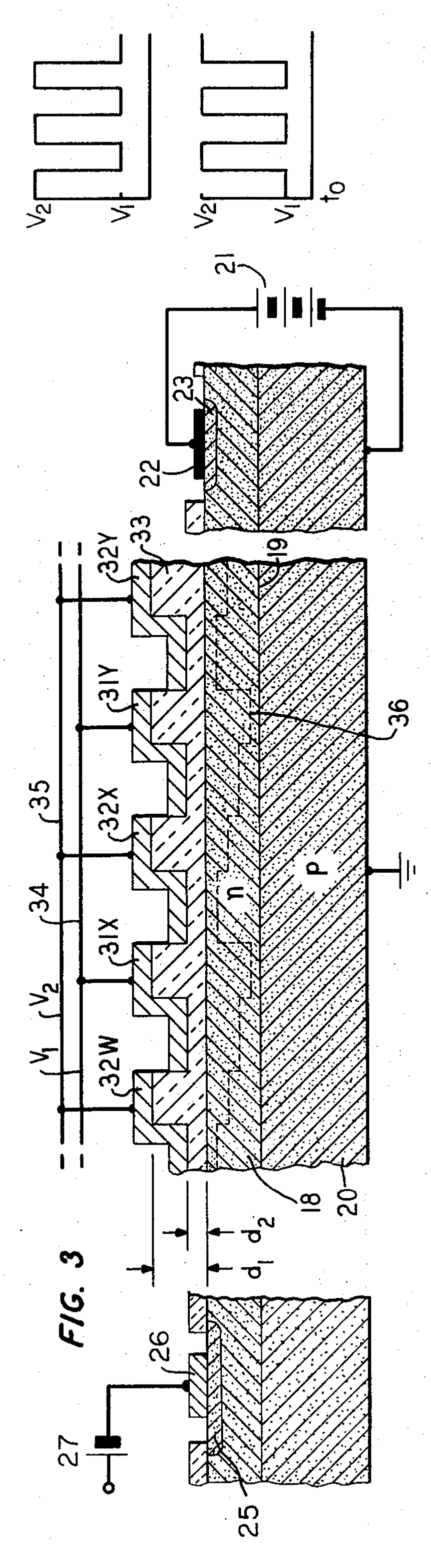
FIG. 3 is a cross-sectional view of a portion of a two-phase buried channel charge coupled device in accordance with a first embodiment of this invention.

First, with reference to FIG. 3, there is shown a cross-sectional view of a portion of a two-phase buried channel charge coupled device in accordance with a first embodiment of this invention. As seen, the structure of FIG. 3, like that of FIG. 1, includes a bulk or substrate portion 20 and an overlying layer 18 of opposite conductivity type forming a PN junction 19 therebetween. And also like FIG. 1, the structure of FIG. 3 includes at the rightmost portion thereof an output portion including battery 21, electrode 22, and zone 23 for reverse-biasing the PN junction and for extracting mobile charge carriers from the storage layer 18.

In contradistinction to the structure of FIG. 1, the structure of FIG. 3 is seen to include a plurality of electrodes 31 and 32, each of which is disposed over and contiguous with a portion of an insulator 33, which portion is of nonuniform thickness denoted $d_1$ and $d_2$ such that portions of each electrode are nonuniformly spaced from the interface between insulator 33 and storage layer 18. It will be appreciated that this two-phase stepped oxide electrode structure is in many respects very similar to the stepped oxide structure disclosed in U.S. Pat. No. 3,651,349, issued Mar. 21, 1972, relating to surface channel charge coupled devices. Surprisingly, however, the direction of propagation of mobile charge carriers relative to the built-in asymmetry in the electrode structure is opposite that of a surface channel CCD.

More specifically, applicant has discovered that in a buried channel CCD of the type illustrated in FIG. 3 the strength of the potential minimum under a particular portion of any particular field plate electrode is directly proportional to the distance which that electrode is spaced from the storage layer insulator interface. This is in direct contradistinction to charge coupled devices taught heretofore, such as the surface channel CCD's.

Still more specifically, in operation the voltage from source 21 is applied between electrode 22 and the back surface of substrate 20 so as to deplete storage layer 18 of mobile charge carriers (in this case electrons); and two-phase positive voltages as shown schematically are applied through a pair of conduction paths 34 and 35, to electrodes 31 and 32, respectively. With $V_1$ applied to electrodes 31 and $V_2$ applied to electrodes 32 at time $t_0$, broken line 36 indicates the approximate value of the electric potential of any potential minimum at any point along the CCD. In the plot of broken line 36, electric potential is plotted as increasing downwardly from the semiconductor-insulator interface. As can be readily seen, the potential is greater under the right-most portion of each electrode than under the left-most portion of that electrode. Accordingly, transfer of mobile charge carriers (in this case electrons) will be to the right in FIG. 3 in response to applied two-phase voltages $V_1$ and $V_2$, whereas if the structure of FIG. 3 were operating in the aforedescribed surface channel mode, transfer would be from right to left in a structure having the built-in asymmetries of FIG. 3. This can be readily ascertained by reference to the aforementioned U.S. Pat. No. 3,651,349.

It will be appreciated that a great variety of methods may be used to fabricate a structure of the type shown in FIG. 3. Two particular methods, however, are considered advantageous at this time, inasmuch as both tend to result in essentially zero effective spacing between successive electrodes. In both techniques the N-type storage layer 18 may be fabricated, for example, by performing a nonselective N-type ion implantation into the surface of a P-type bulk portion or substrate 20. Then, in accordance with a first technique, termed the "undercut isolation technique" as disclosed, for example, in U.S. Pat. application Ser. No. 236,886, filed Mar. 22, 1972, on behalf of C. N. Berglund et al indentations are formed at least partially through a dielectric layer such that the indentations are undercut to provide an overhanging portion of the layer at the perimeter of each indentation. Then, deposition of a thin metal layer results in metal portions in the bottom of the indentation and metal portions on the surface of the dielectric, with the deposited metal being discontinuous at the perimeter of each of the indentations and with essentially zero effective spacing between adjacent portions. Selective connection of adjacent metal portions at any portion of the perimeter of any indentation is made by any of a variety of techniques, such as selective electroless plating of gold through a photoresist mask.

Alternatively, a structure of the type shown in FIG. 3 can be fabricated using the self-aligned refractory gate technology or the self-aligned silicon gate technology in which the lower half of each electrode (the left-most portion of each electrode in FIG. 3) is first formed either of a refractory metal or of silicon. Then this first layer of "metallization" is covered with an insulating coating either by oxidizing the first metal or by depositing an insulating coating; and then a second level of metal is formed over the last-mentioned insulating coating and selective connection is made between adjacent metallizations to provide the so-called "stepped-oxide" structure of FIG. 3. Further details on the so-called "silicon gate" technology may be found, for example, in U.S. Pat. No. 3,475,234, issued Oct. 28, 1969, to R. E. Kerwin et al.

Figure 4:
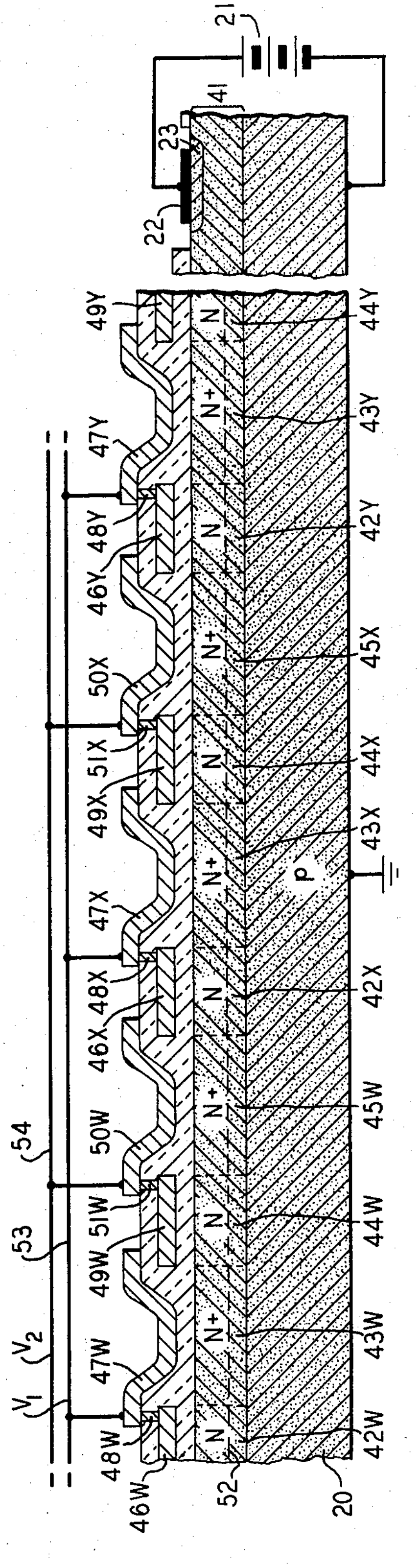
FIG. 4 is a cross-sectional view of a portion of a two-phase buried channel charge coupled device in accordance with a second embodiment of this invention.

With reference now to FIG. 4, there is disclosed a second two-phase buried channel charge coupled device constituting a second embodiment of this invention. As seen, the structure of FIG. 4 includes a bulk or substrate portion 20, overlying which there is an N-type layer designated generally as 41 and including a plurality of recurring portions of more lightly and more heavily doped N-type material indicated as N and $N^+$, respectively. For convenience and reference, the N-type portions have been labeled 42 and 44 with alphabetic suffixes W, X, and Y and the $N^+$ portions have been designated 43 and 45 with corresponding alphabetic suffixes W, X, and Y. Layer 41 including zones 42-45 functions as the storage layer, with the approximate position of the buried channel being indicated by broken line 52.

Over the surface of storage layer 41 are a plurality of successive electrodes, the type illustrated having been formed by the above-described refractory gate or silicon gate self-aligned technology. As such, each electrode includes three distinct parts; for example, features 46W and 47W with feature 48W interconnecting therebetween constitute a single electrode. Similarly, features 49W, 50W, and 51W constitute a single electrode. The other electrodes are similarly labeled, but with different alphabetic suffixes.

An electrode structure of the type shown in FIG. 4 is fabricated by first forming a dielectric layer and then depositing features 46 and 49 thereover. Then a second dielectric coating is formed either by oxidizing features 46 and 49 or by depositing a second dielectric coating. Then features 47 and 50 are formed and a selective interconnection between the respective formed features is made. This is conventional in the above-mentioned self-aligned refractory gate or silicon gate technology. As seen, successive electrodes are connected to alternate ones of a pair of conductive paths 53 and 54 suitable for providing two-phase voltages $V_1$ and $V_2$ to the electrodes to cause separation.

In operation, layer 41 is depleted of mobile charge carriers by application of a voltage through source 21 and zone 23 as in the above-described embodiment. This depletion exposes significantly more ionized donors in the $N^+$ portions of layer 41 than in the N portions, with the result being that underneath the respective electrodes asymmetric potential minima are formed.

Typical concentrations in the N and $N^+$ portions are about, for example, $0.5 \times 10^{12}$ per square centimeter in the N portion and $1.5 \times 10^{12}$ per square centimeter in the $N^+$ portions. Such concentrations can be formed by first doing a nonselective ion implantation into the entire layer 41 to provide a uniform N-type dopant concentration and then selectively introducing additional impurities using the first level metallization, i.e., features 46 and 49, as a mask for the selective ion implantation prior to formation of the second level metallization, i.e., features 47 and 50.

It is not surprising to note the analogies between the structure of FIG. 4 and the surface channel CCD's having ion implanted barriers, for example, of the type disclosed in U.S. Patent application Ser. No. 157,509, filed June 28, 1971, on behalf of R. H. Krambeck and R. H. Walden, now U.S. Pat. No. 3,789,267. However, as in the above-described embodiment of FIG. 3, the surprising thing is that direction of propagation of mobile charge in the buried channel structure of FIG. 4 is opposite to what it would be in a surface channel device. Accordingly, if one simply fabricated a two-phase buried channel structure and attempted to operate it he would not find operative results, inasmuch as the output and input portions would be interchanged. The result would clearly be inoperative and discovery would have to be made that the structure was operating at an inverse direction to what would be expected by analogy to analogous surface channel CCD's.

Another unexpected feature of the structure of FIG. 4 is that in operation in the buried channel mode the charge is stored in the $N^+$ portions, with the N-type portions being used as barriers. This is also complementary to operation in analogous surface channel devices wherein charge is stored in the N-type or less heavily doped portions of the surface; and the $N^+$-type or more heavily doped portions operate as the barrier zones for providing unidirectional transfer in response to two-phase applied voltages.

Although the invention has been described in part by making detailed reference to certain specific embodiments, such detail is intended to be, and will be understood to be, instructive rather than restrictive. It will be appreciated by those in the art that many variations may be made in the structure and modes of operation without departing from the spirit and scope of the invention as disclosed in the teachings contained herein.

For example, throughout the disclosure the semiconductivity types may be reversed as desired, providing a corresponding reversal of voltage polarities also is made.

It should be apparent that the storage layer need not be bounded by a PN junction as shown in the detailed description, but rather may be bounded by a layer forming a Schottky barrier or a metal-insulator barrier layer as described in the aforementioned basic Boyle-Smith disclosure in U.S. application Ser. No. 131,722.

Although not specifically described, it should be apparent that input means analogous to those used in surface channel devices may be used. For example, in the embodiment of FIG. 3 an N-type zone 25 adjacent to any electrode and momentarily established via electrode 26 and voltage means 27 at a potential just slightly less positive than the potential under that electrode can be used to inject controlled amounts of mobile change carriers (electrons) representing information into a channel.

It will further be noted that in the following claims portions of the electrodes designated as "farthest" from the detection means or "closest" to the input means are such as measured along the path of propagation of charge carriers.

What is claimed is:

1. A buried channel charge coupled device of the type adapted for storing and sequentially transferring mobile charge carriers coupled to locally induced internal potential wells comprising a semiconductive storage layer of a first conductivity type overlying a barrier layer;

an insulating layer overlying the storage layer;

contact means for biasing said storage layer in order to deplete said storage layer of mobile charge carriers;

a plurality of electrodes disposed over and forming a path along the surface of the insulating layer;

detection means at one end of said path for detecting mobile charge carriers in said storage layer;

means in response to two-phase voltages of sufficient magnitude applied between the electrodes and the storage layer for causing under each electrode the formation of an asymmetric potential well internal to the storage layer, the asymmetry in the potential wells being sufficient in response to the two-phase voltages for causing mobile charge carriers to propagate unidirectionally in the bulk of said storage layer toward said detection means.

2. A device as recited in claim 1 wherein the barrier layer is a semiconductor of the opposite type conductivity forming a PN junction with the storage layer.

3. Apparatus as recited in claim 1 wherein the means for causing under each electrode an asymmetric potential well includes in each electrode a first conductive portion and a second conductive portion wherein the first conductive portion is the portion of the electrode farthest away from said detection means, the first conductive portion being spaced at a substantially lesser distance from the surface of the storage medium than is the second portion.

4. Apparatus as recited in claim 1 wherein the means for causing under each electrode an asymmetric potential well includes, in that portion of the storage layer under the first conductive portion of each electrode, a concentration of immobile charge substantially less than the concentration of immobile charge underneath the second portion of said electrode wherein the first conductive portion is the portion of the electrode farthest away from said detection means.

5. Apparatus as recited in claim 4, wherein the mobile charge carriers are of a first polarity and the immobile charge is of the opposite polarity.

6. Apparatus as recited in claim 1 wherein the semiconductive storage layer includes silicon and the insulating layer includes silicon oxide.

7. Apparatus as recited in claim 1 further including means for providing to the electrodes two-phase voltages of polarity and magnitude sufficient for causing the mobile charge carriers to propagate unidirectionally.

8. A buried channel charge coupled device of the type adapted for storing and sequentially transferring charge carriers coupled to locally induced internal potential wells comprising a first semiconductive layer of one conductivity type; a semiconductive storage layer of the opposite conductivity type overlying the first layer and forming a PN junction therewith; an insulating layer overlying the storage layer; input means associated with a first position on said storage layer; output means associated with a second position along said storage layer; contact means for biasing said storage layer in order to deplete said storage layer of mobile charge carriers; and a plurality of electrodes disposed over the surface of the insulating layer and forming a path between the input means and the output means, the improvement being that each of said electrodes includes a first conductive portion and a second conductive portion, the first conductive portion being the one closest to the input means and being spaced at a substantially lesser distance from the surface of the storage layer than is the second portion.

9. A buried channel charge coupled device of the type adapted for storing and sequentially transferring charge carriers coupled to locally induced internal potential wells comprising a first semiconductive layer of one conductivity type; a semiconductive storage layer of the opposite conductivity type overlying the first layer and forming a PN junction therewith; an insulating layer overlying the storage layer; input means associated with a first position along said storage layer; output means associated with a second position along said storage layer; contact means for biasing said storage layer in order to deplete said storage layer of mobile charge carriers; and a plurality of electrodes disposed over the surface of the insulating layer and forming a path between the input means and the output means, each of said electrodes including a first conductive portion and a second conductive portion, the first conductive portion being the one closest to the input means and that portion of the storage layer underneath the first portion including a concentration of immobile charge of the same polarity as the storage layer substantially less than the concentration of immobile charge of the same polarity as the storage layer underneath the second portion.

* * * * *